(12) United States Patent
Pan et al.

(10) Patent No.: US 10,911,301 B2
(45) Date of Patent: Feb. 2, 2021

(54) COMMUNICATIONS DEVICE CONFIGURATION METHOD AND COMMUNICATIONS DEVICE

(71) Applicant: Huawei Technologies Co., Ltd., Shenzhen (CN)

(72) Inventors: Houyuan Pan, Nanjing (CN); Yanfei Ye, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 15/809,667

(22) Filed: Nov. 10, 2017

(65) Prior Publication Data
US 2018/0139093 A1 May 17, 2018

(30) Foreign Application Priority Data
Nov. 11, 2016 (CN) .......................... 2016 1 0998003

(51) Int. Cl.
  *G06F 15/177* (2006.01)
  *H04L 12/24* (2006.01)
  *H04L 12/26* (2006.01)

(52) U.S. Cl.
  CPC .......... *H04L 41/0813* (2013.01); *H04L 41/00* (2013.01); *H04L 43/00* (2013.01); *H04L 43/0811* (2013.01)

(58) Field of Classification Search
  CPC ..... H04L 43/0811; H04L 43/00; H04L 41/00; H04L 41/0813; H04L 41/085;
  (Continued)

(56) References Cited

U.S. PATENT DOCUMENTS

| 6,052,362 A * | 4/2000 | Somer ..................... H04L 43/50 370/246 |
| 6,229,538 B1 * | 5/2001 | McIntyre .............. G06F 11/324 709/220 |

(Continued)

FOREIGN PATENT DOCUMENTS

| CN | 101056224 A | 10/2007 |
| CN | 102073504 A | 5/2011 |

(Continued)

OTHER PUBLICATIONS

Chew, P.F., et al.,"Low-Cost Loop-Back Scheme for a Parallel Data Port," XP013026986, IBM TDB, Nov. 1, 1989, 4 pages.

(Continued)

*Primary Examiner* — Dustin Nguyen
*Assistant Examiner* — Hao H Nguyen
(74) *Attorney, Agent, or Firm* — Conley Rose, P.C.

(57) ABSTRACT

A communications device configuration method and a communications device, applied to simplify a communications device configuration process, where the communications device configuration method includes sending, by the communications device, a first loopback packet using a first physical port after the communications device is started, where the first loopback packet includes a loopback tag, and selecting, by the communications device, a first configuration option from at least two configuration options when a second physical port of the communications device receives the first loopback packet, and configuring the communications device according to the first configuration option.

20 Claims, 3 Drawing Sheets

---

[101] A communications device sends a first loopback packet using a first physical port after the communications device is started, where the first loopback packet includes a loopback tag

[102] If another physical port of the communications device receives the first loopback packet, the communications device selects a corresponding configuration option, and configures the communications device according to the selected configuration option

[103] If physical ports of the communications device do not receive the loopback packet, the communications device selects another corresponding configuration option, and configures the communications device according to the selected configuration option

(58) Field of Classification Search
CPC ... H04L 41/0866; H04L 49/25; H04L 49/253; H04L 49/3018; H04L 49/3027
USPC ........... 709/220–224; 370/217–218, 220, 370/227–228, 241–242, 245–246, 249
See application file for complete search history.

(56) References Cited

U.S. PATENT DOCUMENTS

| | | | |
|---|---|---|---|
| 6,381,218 B1* | 4/2002 | McIntyre | G06F 11/3006 370/216 |
| 7,792,027 B2 | 9/2010 | Tatar et al. | |
| 7,835,380 B1 | 11/2010 | Aloni et al. | |
| 9,025,490 B2 | 5/2015 | Davari et al. | |
| 2006/0129667 A1* | 6/2006 | Anderson | G06F 9/5077 709/223 |
| 2007/0094410 A1* | 4/2007 | Voigt | H04L 43/0811 709/237 |
| 2007/0121518 A1 | 5/2007 | Arunachalam et al. | |
| 2008/0304420 A1* | 12/2008 | Deragon | H04L 12/4645 370/249 |
| 2010/0180221 A1* | 7/2010 | Cloward | G06F 16/2365 715/764 |
| 2011/0142044 A1* | 6/2011 | Csaszar | H04L 29/12066 370/390 |
| 2011/0317565 A1 | 12/2011 | Krishnamurthi et al. | |
| 2013/0322868 A1 | 12/2013 | Wellbrock et al. | |
| 2014/0040881 A1* | 2/2014 | Thorsen | G06F 8/61 717/177 |
| 2015/0049894 A1* | 2/2015 | DiTullo | H04R 1/026 381/333 |
| 2016/0205008 A1 | 7/2016 | Dasu et al. | |
| 2016/0269895 A1* | 9/2016 | Soini | G06F 3/04847 |
| 2017/0093896 A1* | 3/2017 | Poornachandran | G06F 21/575 |
| 2018/0007551 A1* | 1/2018 | Wang | H04L 63/0876 |

FOREIGN PATENT DOCUMENTS

| | | |
|---|---|---|
| CN | 102325046 A | 1/2012 |
| CN | 105718302 A | 6/2016 |
| RU | 2310999 C2 | 11/2007 |

OTHER PUBLICATIONS

Foreign Communication From a Counterpart Application, European Application No. 17201022.5, Extended European Search Report dated Feb. 2, 2018, 6 pages.

Foreign Communication From a Counterpart Application, Russian Application No. 2017139074, Russian Official Action dated Aug. 28, 2018, 4 pages.

Foreign Communication From a Counterpart Application, Russian Application No. 2017139074, English Translation of Russian Official Action dated Aug. 28, 2018, 3 pages.

Foreign Communication From a Counterpart Application, Russian Application No. 2017139074, Russian Search Report dated Aug. 9, 2018, 2 pages.

Foreign Communication From a Counterpart Application, Russian Application No. 2017139074, English Translation of Russian Search Report dated Aug. 9, 2018, 2 pages.

Anonymous,"Cisco routers and switches also play with multiple operating systems(Advanced IOS file system)", Retrieved from Internet :http://www.360doc.com/content/12/0706/15/10234899_222626485.shtml, Jul. 6, 2012, 9 pages.

Machine Translation and Abstract of Chinese Publication No. CN101056224, Oct. 17, 2007, 16 pages.

Machine Translation and Abstract of Chinese Publication No. CN102073504, May 25, 2011, 19 pages.

Machine Translation and Abstract of Chinese Publication No. CN105718302, Jun. 29, 2016, 13 pages.

Foreign Communication From a Counterpart Application, Chinese Application No. 201610998003.8, Chinese Office Action dated Nov. 6, 2019, 8 pages.

\* cited by examiner

COMMUNICATIONS DEVICE CONFIGURATION METHOD AND COMMUNICATIONS DEVICE

CROSS-REFERENCE TO RELATED APPLICATION

This application claims priority to Chinese Patent Application No. 201610998003.8 filed on Nov. 11, 2016, which is hereby incorporated by reference in its entirety.

TECHNICAL FIELD

This application disclosure relates to the field of communications technologies, and in particular, to a communications device configuration method and a communications device.

BACKGROUND

Different communications devices need to be used in different scenarios. For example, different types of switches need to be used in a cloud management network and a conventional network. Therefore, a communications device manufacturer needs to manufacture corresponding products separately for different scenarios.

SUMMARY

This application provides a communications device configuration method and a communications device, to simplify a communications device configuration process.

According to a first aspect, a communications device configuration method is provided to configure different communications device in different scenarios. After a communications device is started, a first loopback packet is sent using a first physical port of the communications device. The first loopback packet includes a loopback tag. The loopback tag is used to identify that the first loopback packet is a packet sent internally by the communications device instead of a packet sent by another external device. The loopback tag is further used to identify that the first loopback packet is a packet used to configure the communications device. The first loopback packet is used only between physical ports of the communications device. If a second physical port of the communications device receives the first loopback packet, it indicates that the first physical port and the second physical port are connected using a cable. The cable may be a network cable, an optical fiber, or the like. Based on a mode of connection between the first physical port and the second physical port, the communications device selects a first configuration option from multiple configuration options, and configures the first configuration option for the communications device.

A communications device manufacturer may provide communications devices of a same hardware specification for different scenarios, and store configuration options corresponding to the different scenarios in the communications devices. Before using the communications device, a user selects a configuration option corresponding to a scenario required by the user. Simplifying a process of selecting a configuration option by a user may decrease a possibility of an incorrect configuration. In the foregoing configuration option selection solution, the user may instruct, by only using a cable to connect physical ports of a to-be-configured communications device, the communications device to select a configuration option corresponding to a connection mode. For a communications device that uses the configuration option selection solution, no extra hardware module needs to be added, an overall configuration workload is small, and a configuration process is simple.

In some possible implementations, different configuration options may be different operating system files, or different configuration parameters of the communications device. If a configuration option is an operating system file, for example, the first configuration option is an operating system file A, after selecting the first configuration option, the communications device may be restarted, and load the operating system file A during starting in order to implement configuration of the first configuration option.

Different configuration options are configured for the communications device according to different connection modes of physical ports. Different connection modes may be used to distinguish between different modes of the communications device. For example, the communications device has N physical ports, and a mode in which a physical port 1 is connected to a physical port 2 identifies that the communications device is a master device, and a mode in which the physical port 1 is connected to a physical port 3 identifies that the communications device is a slave device, and the like. Different configuration options are further used to implement communications devices in different application scenarios. For example, an operating system A is configured for the communications device according to the mode in which the physical port 1 is connected to the physical port 2 in order to implement the communications device as a cloud switch, an operating system B is configured for the communications device according to the mode in which the physical port 1 is connected to the physical port 3 in order to implement the communications device as a conventional switch.

In some possible implementations, the loopback tag includes one or more of electronic code of the communications device, information about a key component of the communications device, or a random value. An electronic label is installed on the communications device. An electronic label of each communications device stores unique electronic code of the communications device. Generally, the electronic label includes a coupled element and a chip, which are attached to the communications device to identify the communications device. The information about the key component of the communications device includes information, such as a manufacturer, a model, a specification, a technical parameter, or an applicable standard, about the key component, such as a cord set, a controller, an electronic circuit board, or a material of the communications device. The random value may be a random number output by a processor of the communications device.

A manufacturer may set different connection mode rules for the communications device. A user connects, using a cable, the physical ports of the communications device according to the rules, to select a configuration option. The following are some optional rules.

In some possible implementations, if a third physical port receives the first loopback packet, the communications device selects a second configuration option from at least two configuration options, and configures the communications device according to the second configuration option. In this rule, that the user connects different physical ports using the cable is considered as a different connection mode. A different connection mode and a corresponding configuration option are obtained when the user connects the first physical port to another different physical port using the cable.

In some possible implementations, if any physical port other than the first physical port of the communications device receives the first loopback packet, the communications device selects the first configuration option from the at least two configuration options, and configures the communications device according to the first configuration option. In this rule, that the user connects the physical ports using the cable and that the user does not connect the physical ports are considered as different connection modes. A same connection mode is obtained when the user connects the first physical port to any other physical port using the cable.

In some possible implementations, if none of physical ports of the communications device receives the first loopback packet, the communications device selects a third configuration option from the at least two configuration options, and configures the communications device according to the third configuration option. In this rule, only that the user connects the first physical port using the cable is considered as selecting a connection mode different from a mode in which the physical ports are not connected using a cable.

In some possible implementations, after sending the first loopback packet using the first physical port, the communications device sends a second loopback packet using a fourth physical port. If a fifth physical port receives the second loopback packet, the communications device selects a third configuration option from the at least two configuration options, and configures the communications device according to the third configuration option. In this rule, that the user connects another physical port other than the first physical port using the cable is also considered as selecting a connection mode.

In some possible implementations, before sending the first loopback packet, the communications device is in a to-be-configured state. For example, the communications device at initial delivery is in the to-be-configured state.

In some possible implementations, before the first loopback packet is sent, the first physical port is in an up state. Generally, when the first physical port is connected using the cable, it is considered that the first physical port is in the up state.

In some possible implementations, after configuring the communications device according to the first configuration option, the communications device displays the configuration option used by the communications device. After completing configuration of the communications device, the communications device provides an indicator. The indicator is configured to display the configuration option of the communications device to facilitate user consultation. For example, different configuration options correspond to different indicating lamps. Alternatively, different configuration options correspond to different colors of an indicating lamp.

According to a second aspect, a communications device is provided. The communications device is configured to implement a function of the method provided in the first aspect or any implementation of the first aspect. The function may be implemented by hardware, or may be implemented by hardware by executing corresponding software. The hardware or software includes one or more modules corresponding to the function.

According to a third aspect, a storage medium is provided. The storage medium stores program code. When the program code is run by a communications device, the communications device configuration method provided in the first aspect or any implementation of the first aspect is executed.

The storage medium includes, but is not limited to, a flash memory, a hard disk drive (HDD), or a solid state drive (SSD).

DESCRIPTION OF EMBODIMENTS

In the specification, claims, and accompanying drawings of the present disclosure, the terms "first," "second," "third," "fourth," "fifth," and so on are intended to distinguish between similar objects but do not necessarily indicate a specific order or sequence.

In this application, "multiple" means two or more.

To improve production efficiency by reducing product models, a communications device manufacturer may provide communications devices of a same hardware specification for different scenarios. After purchasing the communications device, a user may use different configurations in different scenarios. For example, different types of switches need to be used in a cloud management network and a conventional network. In this case, the communications device manufacturer provides only one switch that stores two operating system files. After purchasing the switch, a user enables a corresponding operating system file according to a scenario to obtain the switch that works in the corresponding scenario. To simplify a process in which a user selects a required configuration, embodiments of the present disclosure provide the following method and communications device.

Figure 1:
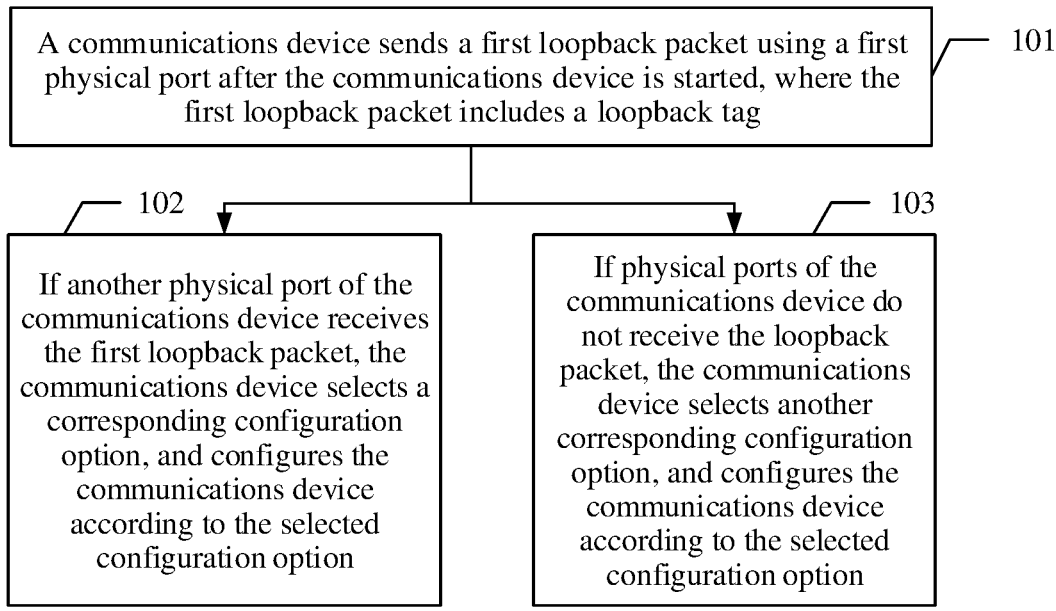
FIG. 1 is a flowchart diagram of an embodiment of a communications device configuration method according to an embodiment of the present disclosure.

Referring to FIG. 1, FIG. 1 is a flowchart diagram of an embodiment of a communications device configuration method according to an embodiment of the present disclosure. A specific process of this embodiment is as follows.

Step 101: A communications device sends a first loopback packet using a first physical port after the communications device is started, where the first loopback packet includes a loopback tag.

The communications device may be an Ethernet communications device or a non-Ethernet communications device. The communications device includes multiple physical ports. The multiple physical ports may be used to implement multiple communication connection modes. For example, the communications device has N physical ports. If a connection between any two different physical ports is considered as a different connection mode, and that none of the physical ports is connected is considered as one connection mode, there are [N*(N−1)]/2+1 communication connection modes.

Optionally, after selecting a configuration option according to a connection mode, the communications device may record the selection result. The communications device that records the selection result is in a configured state. After the communications device is restarted, the communications device may skip, according to the recorded selection result, a phase in which a configuration option is selected according to a connection mode, and directly configure the communications device according to the configuration option in the recorded selection result. In an initial phase, the communications device is in a to-be-configured state. For example, the communications device at initial delivery is in the to-be-configured state. That is, multiple communications devices at the initial delivery have a same hardware specification, and a configuration option is not selected. For another example, to select a configuration option B, the communications device that previously selects a configuration option A deletes the configuration option A, and in this case, the communications device is in the to-be-configured state.

Because a physical port of the communications device is in a down state when no cable is inserted, optionally, the communications device sends a loopback packet using only a physical port that is in an up state. For example, when the communications device sends the first loopback packet using the first physical port, the first physical port is in the up state. The cable may be a twisted pair, an optical fiber, a coaxial cable, a jumper, an electrical power cable, or the like.

To implement the communications device in different scenarios, the communications device sends the first loopback packet using the first physical port after the communications device is started. The first physical port is any physical port of the communications device. Generally, to distinguish between the physical ports, each physical port has its own port number. The first loopback packet is used between the physical ports of the communications device. The first loopback packet includes the loopback tag. The loopback tag is used to identify that the first loopback packet is a packet sent internally by the communications device instead of a packet sent by another external device. In addition, the loopback tag is used to indicate that the first loopback packet is used to configure the communications device.

The loopback tag includes at least one of electronic code of the communications device, information about a key component of the communications device, or a random value. An electronic label is installed on the communications device. An electronic label of each communications device stores unique electronic code of the communications device, and the electronic label identifies the communications device using a coupled element or a chip. For example, a chip is attached to the communications device. The chip identifies that the communications device is a switch that has 48 Gigabit Ethernet (GE) ports. The information about the key component of the communications device includes information, such as a manufacturer, a model, a specification, a technical parameter, or an applicable standard, about the key component, such as a cord set, a controller, an electronic circuit board, or a material of the communications device. A sequence number may be a default code number at delivery or a code number set by manufacturers by means of negotiation. The code number may be a number, a letter, a symbol, or the like. This is not limited herein. The random value may be a random number output by a processor of the communications device.

Step 102: If another physical port of the communications device receives the first loopback packet, the communications device selects a corresponding configuration option, and configures the communications device according to the selected configuration option.

The communications device detects a mode of connection between the multiple physical ports of the communications device based on a loopback packet. Different configuration options are configured for the communications device according to different connection modes.

Different configuration options may be different operating system files. The operating system files may be operating system files that are of a same model of a same type and that are used in different scenarios. Alternatively, the operating system files may be operating system files of different types, such as an ANDROID operating system file, a MAC OS operating system file, or a WINDOWS operating system file. Alternatively, different configuration options may be different configuration parameters of the communications device, for example, an Internet Protocol (IP) address. For example, an operating system file A is configured for the communications device according to a connection mode A to implement the communications device as a cloud switch. For example, after selecting the operating system file A, the communications device may be restarted, and then load the operating system file A after being started to implement configuration of the cloud switch. An operating system file B is configured for the communications device according to a connection mode B to implement the communications device as a conventional switch.

A manufacturer sets different connection mode rules for the communications device. A user connects, using a cable, the physical ports of the communications device according to the rules to select a corresponding configuration option. The following are some possible rules.

In an optional rule 1, that the user connects different physical ports using the cable is considered as a different connection mode. A different connection mode and a corresponding configuration option are obtained when the user connects the first physical port to another different physical port using the cable. For example, if the user connects the first physical port to a second physical port using the cable, and the second physical port receives the first loopback packet, the communications device selects a first configuration option to configure the communications device. If the user connects the first physical port to a third physical port using the cable, and the third physical port receives the first loopback packet, the communications device selects a second configuration option, and configures the communications device according to the second configuration option.

In an optional rule 2, that the user connects the physical ports using the cable and that the user does not connect the physical ports are considered as different connection modes. If the user connects the first physical port to any other physical port using the cable, and the any physical port other than the first physical port receives the first loopback packet, the communications device selects a first configuration option. For example, if the user connects the first physical port to a second physical port using the cable, and the second physical port receives the first loopback packet, the communications device selects the first configuration option to configure the communications device. If the user connects the first physical port to a third physical port using the cable, and the third physical port receives the first loopback packet, the communications device also selects the first configuration option, and configures the communications device according to the first configuration option.

Step 103: If physical ports of the communications device do not receive the loopback packet, the communications device selects another corresponding configuration option, and configures the communications device according to the selected configuration option.

If the physical ports of the communications device do not receive the loopback packet, a connection mode is a mode in which the physical ports are not connected, and the communications device selects a fourth configuration option, and configures the communications device according to the fourth configuration option.

The communications device may determine, according to the following optional rules, that the connection mode is the mode in which the physical ports are not connected.

In an optional rule 3, after detecting whether the first physical port is connected to another physical port, the communications device stops detecting, and selects the fourth configuration option according to that the connection mode is the mode in which the physical ports are not connected. If none of the physical ports of the communications device receives the first loopback packet, the communications device selects the fourth configuration option from at least two configuration options, and configures the communications device according to the fourth configuration option.

In the optional rule 3, only that the user connects the first physical port to another physical port using the cable is considered as selecting a connection mode different from the mode in which the physical ports are not connected.

In an optional rule 4, after detecting whether the first physical port is connected to another physical port, the communications device may further detect whether the other physical port is connected to any physical port other than the first physical port. For example, after sending the first loopback packet using the first physical port, the communications device sends a second loopback packet using a fourth physical port. If a fifth physical port receives the second loopback packet, the communications device selects a third configuration option from the at least two configuration options, and configures the communications device according to the third configuration option. In this rule, that the user connects another physical port other than the first physical port using the cable is also considered as selecting a connection mode different from the mode in which the physical ports are not connected. The third configuration option may be the same as or different from the first configuration option or the second configuration option in the foregoing optional rule 1 or optional rule 2. After loopback packets are sent separately using physical ports that need to be detected, if none of the physical ports receives the loopback packets, the communications device selects the fourth configuration option according to that the connection mode is the mode in which the physical ports are not connected, and configures the communications device according to the fourth configuration option.

Optionally, after configuring the communications device using a configuration option, the communications device further displays the configuration option used by the communications device.

After completing configuration of the communications device, the communications device provides an indicator. The indicator is configured to display the configuration option of the communications device to facilitate user consultation. The indicator may be an indicating lamp, a liquid crystal display, or the like. For example, different configuration options correspond to different indicating lamps. Alternatively, different configuration options correspond to different colors of an indicating lamp.

Figure 2:
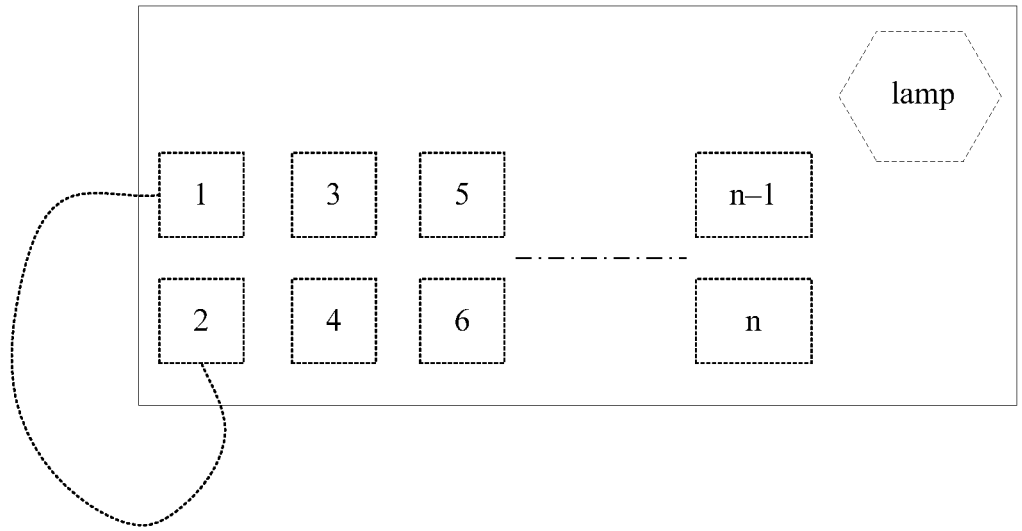
FIG. 2 is a schematic diagram of an embodiment of a connection between physical ports of a communications device according to an embodiment of the present disclosure.
Figure 3:
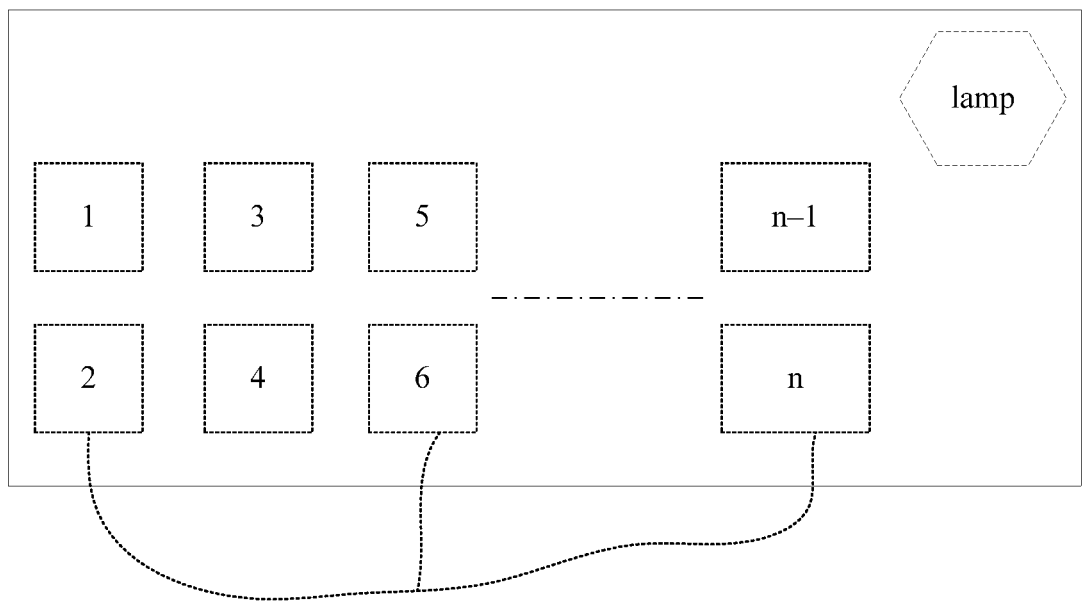
FIG. 3 is a schematic diagram of another embodiment of a connection between physical ports of a communications device according to an embodiment of the present disclosure.

During actual application, a panel of a communications device has n physical ports. n is a natural number greater than 1. If the communications device is an Ethernet electrical interface device, a self-loop connection is established between at least two physical ports using a universal network cable. If the communications device is a non-Ethernet electrical interface device, a self-loop connection is established between at least two physical ports using a cable. As shown in FIG. 2, a physical port 1 and a physical port 2 are connected, and as shown in FIG. 3, a physical port 2, a physical port 6, and a physical port n are connected. Different configuration options are configured for the communications device according to different communication connection modes of physical ports. For example, a self-loop connection between a physical port 1 and a physical port 2 is a default configuration manner, and is used for a configuration in a common application scenario, for example, a non-cloud management scenario or a cloud management scenario. The communications device may further provide an indicating lamp that displays a configuration status of the communications device such that the user learns the configuration status of the communications device in time. It can be learned that diversified configuration options are implemented according to different communication connection modes of physical ports in order to meet requirements on a communications device in different scenarios. After a configuration scenario is determined, and if a user expects to return to a default configuration scenario, the user may connect physical ports in the default configuration scenario.

Figure 4:
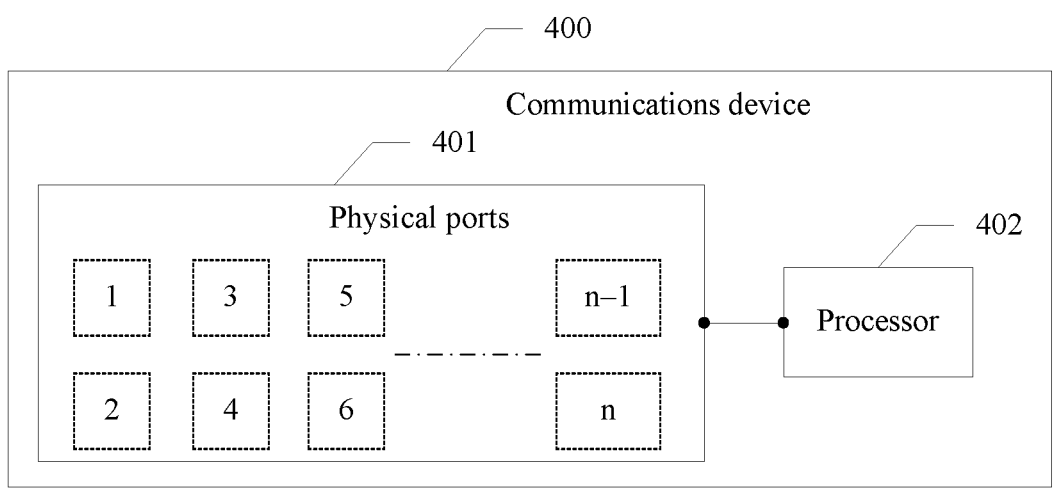
FIG. 4 is a schematic structural diagram of a communications device according to an embodiment of the present disclosure.

The embodiment shown in FIG. 1 describes a configuration process of a communications device, and the following describes a structure of the communications device. As shown in FIG. 4, FIG. 4 is a schematic structural diagram of a communications device 400. The communications device 400 includes at least two physical ports 401 (may contain 1, . . . , n physical ports as shown in FIG. 4) and a processor 402. The at least two physical ports 401 are in communication connection with the processor 402. The at least two physical ports 401 may be Ethernet ports, optical fiber ports, RS232 ports, RS485 ports, or the like. The processor 402 may be a central processing unit (CPU), a network processor, or the like.

The processor 402 is configured to send a first loopback packet using a first physical port in the at least two physical ports 401 after the communications device 400 is started. The first loopback packet includes a loopback tag, and the loopback tag includes one or more of electronic code of the communications device 400, information about a key component of the communications device 400, or a random value. Before the processor 402 sends the first loopback packet using the first physical port, the communications device 400 is in a to-be-configured state, and the first physical port is in an up state.

If a second physical port in the at least two physical ports 401 receives the first loopback packet, the processor 402 is further configured to select a first configuration option from at least two configuration options, and configure the communications device 400 according to the first configuration option.

In some possible implementations, if any physical port other than the first physical port in the at least two physical ports 401 receives the first loopback packet, the communications device 400 selects the first configuration option from the at least two configuration options, and configures the communications device 400 according to the first configuration option. That a user connects physical ports using a cable and that the user does not connect the physical ports are considered as different connection modes. A same connection mode is obtained when the user connects the first physical port to any other physical port using the cable.

In some possible implementations, if a third physical port in the at least two physical ports 401 receives the first loopback packet, the processor 402 is further configured to select a second configuration option from the at least two configuration options, and configure the communications device 400 according to the second configuration option. That the user connects different physical ports using the cable is considered as a different connection mode. A different connection mode and a corresponding configuration option are obtained when the user connects the first physical port to another different physical port using the cable.

In some possible implementations, if none of the at least two physical ports 401 receives the first loopback packet, the processor 402 is further configured to select a third configuration option from the at least two configuration options, and configure the communications device 400 according to the third configuration option. Only that the user connects the first physical port using the cable is considered as selecting a connection mode different from a mode in which the physical ports are not connected using a cable.

In some possible implementations, after sending the first loopback packet using the first physical port, the processor 402 is further configured to send a second loopback packet using a fourth physical port in the at least two physical ports 401. If a fifth physical port in the at least two physical ports 401 receives the second loopback packet, the processor 402 is further configured to select a third configuration option from the at least two configuration options, and configure the communications device according to the third configuration option. That the user connects another physical port other than the first physical port using the cable is also considered as selecting a connection mode.

In some possible implementations, different configuration options may be different operating system files, or different configuration parameters of the communications device 400. If a configuration option is an operating system file, for example, the first configuration option is an operating system file A, after selecting the first configuration option, the communications device 400 may be restarted, and load the operating system file A during starting in order to implement configuration of the first configuration option.

Figure 5:
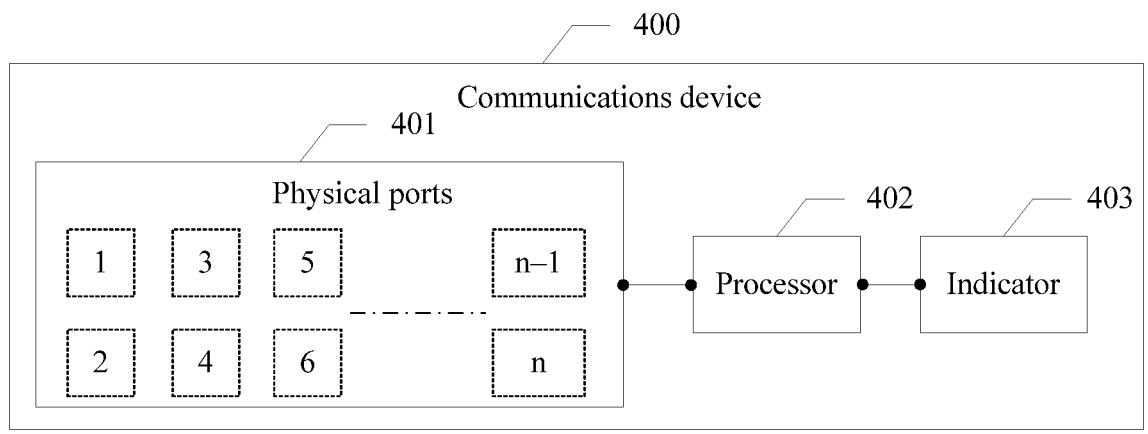
FIG. 5 is another schematic structural diagram of a communications device according to an embodiment of the present disclosure.

Based on the communications device 400 shown in FIG. 4, referring to FIG. 5, the communications device 400 further includes an indicator 403. The indicator 403 is configured to display a configuration option used by the communications device 400 after the processor 402 configures the communications device 400 according to the first configuration option.

After completing configuration of the communications device 400, the indicator 403 is configured to display the configuration option of the communications device 400 in order to facilitate user consultation. The indicator 403 may be an indicating lamp, a display screen, or the like. This is not limited herein.

Figure 6:
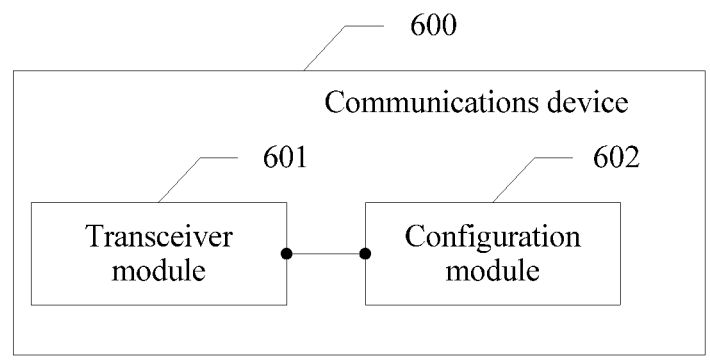
FIG. 6 is another schematic structural diagram of a communications device according to an embodiment of the present disclosure.

Referring to FIG. 6, FIG. 6 is another schematic structural diagram of a communications device 600. The communications device 600 includes a transceiver module 601 and a configuration module 602.

The transceiver module 601 is configured to send a first loopback packet using a first physical port after the communications device 600 is stated. The first loopback packet includes a loopback tag. The loopback tag includes one or more of electronic code of the communications device 600, information about a key component of the communications device 600, or a random value.

Before the transceiver module 601 sends the first loopback packet, the communications device 600 is in a to-be-configured state. The to-be-configured state may be a state of the communications device 600 at initial delivery, that is, multiple communications devices 600 at initial delivery have a same hardware specification, and a configuration option is not selected.

If a second physical port of the communications device 600 receives the first loopback packet, the configuration module 602 is configured to select a first configuration option from at least two configuration options, and configure the communications device 600 according to the first configuration option. If any physical port other than the first physical port of the communications device 600 receives the first loopback packet, the first configuration option is selected from the at least two configuration options, and the communications device 600 is configured according to the first configuration option.

In some possible implementations, if a third physical port of the communications device 600 receives the first loopback packet, the configuration module 602 is further configured to select a second configuration option from the at least two configuration options, and configure the communications device 600 according to the second configuration option.

In some possible implementations, if none of physical ports of the communications device 600 receives the first loopback packet, the configuration module 602 is further configured to select a third configuration option from the at least two configuration options, and configure the communications device 600 according to the third configuration option.

In some possible implementations, after sending the first loopback packet using the first physical port, the transceiver module 601 is further configured to send a second loopback packet using a fourth physical port of the communications device 600, and if a fifth physical port of the communications device 600 receives the second loopback packet, the configuration module 602 is further configured to select a third configuration option from the at least two configuration options, and configure the communications device 600 according to the third configuration option.

Figure 7:
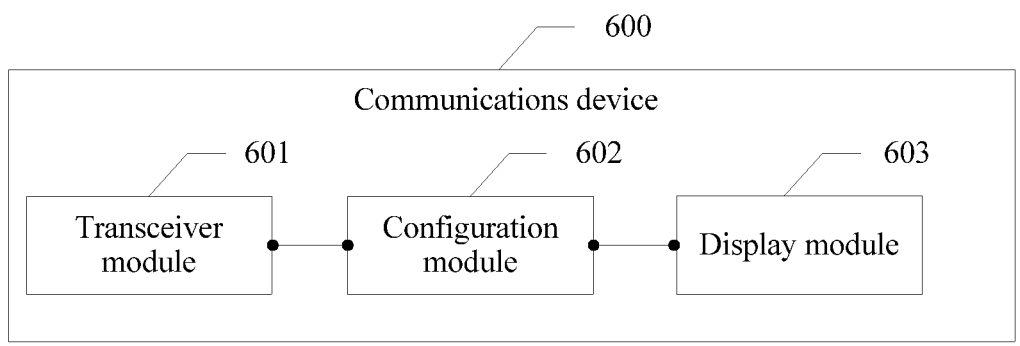
FIG. 7 is another schematic structural diagram of a communications device according to an embodiment of the present disclosure.

Based on the communications device 600 shown in FIG. 6, referring to FIG. 7, the communications device 600 further includes a display module 603.

The display module 603 is configured to display the configuration option used by the communications device 600 after the configuration module 602 configures the communications device 600 according to the first configuration option.

After completing configuration of the communications device 600, the display module 603 displays the configuration option of the communications device 600 in order to facilitate user consultation. The display module 603 may be an indicating lamp, a display, or the like.

It can be learned that to improve production efficiency by simplifying a configuration process of a communications device, different configuration options are configured for the communications device according to different connection modes of physical ports in order to determine that the communications device is a master device, a slave device, or the like, or to implement the communications device as a communications device such as a cloud switch or a conventional switch in different application scenarios. No extra hardware module needs to be added, an overall configuration workload is small, and a configuration process is simple.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the this application, the system, apparatus and method may be implemented in other manners. For example, the described apparatus embodiment is merely an example. For example, the unit division is merely logical function division and may be other division during actual implementation. For example, a plurality of units or components may be combined or integrated into another system.

The units described as separate parts may or may not be physically separate, and parts displayed as units may or may not be physical units, may be located in one position, or may be distributed on a plurality of network devices.

All or a part of the technical solutions of the present disclosure may be implemented in a form of a computer software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash disk, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons skilled in the art should understand that they may still make modifications to the technical solutions described in the foregoing embodiments or replace some technical features with features having a same function, without departing from the scope of the claims in the present disclosure.

What is claimed is:

1. A communications device configuration method, comprising:
   storing, by a communications device, an electronic label on the communications device, wherein the electronic label identifies the communications device uniquely;
   sending, by the communications device, a first loopback packet using a first physical port after the communications device is started, wherein the first loopback packet comprises a loopback tag and the electronic label;
   selecting, by the communications device, a first configuration option from at least two configuration options in response to a second physical port of the communications device receiving the first loopback packet, wherein each of the configuration options corresponds to a different operating system mode;
   selecting, by the communication device, an operating system mode corresponding to the first configuration option; and
   configuring, by the communications device, the communications device according to the selected operating system mode corresponding to the first configuration option after the communications device restarted.

2. The communications device configuration method of claim 1, wherein the loopback tag comprises a random value.

3. The communications device configuration method of claim 1, wherein the loopback tag comprises any two or all of the electronic label of the communications device, information about a key component of the communications device, or a random value.

4. The communications device configuration method of claim 1, wherein in response to a third physical port of the communications device receiving the first loopback packet, the communications device configuration method further comprises:
   selecting, by the communications device, a second configuration option from the at least two configuration options;
   selecting, by the communication device, an operating system mode corresponding to the second configuration option; and
   configuring, by the communications device, the communications device according to the selected operating system mode corresponding to the second configuration option after the communications device restarted.

5. The communications device configuration method of claim 1, wherein selecting the first configuration option comprises:
   selecting, by the communications device, the first configuration option from the at least two configuration options in response to any physical port other than the first physical port of the communications device receiving the first loopback packet;
   selecting, by the communication device, an operating system mode corresponding to the first configuration option; and
   configuring, by the communications device, the communications device according to the selected operating system mode corresponding to the first configuration option after the communications device restarted.

6. The communications device configuration method of claim 1, wherein in response to none of physical ports of the communications device receiving the first loopback packet, the communications device configuration method further comprises:
   selecting, by the communications device, a second configuration option from the at least two configuration options;
   selecting, by the communication device, an operating system mode corresponding to the second configuration option; and
   configuring, by the communications device, the communications device according to the selected operating system mode corresponding to the second configuration option after the communications device restarted.

7. The communications device configuration method of claim 1, further comprising:
   sending, by the communications device, a second loopback packet using a third physical port after sending the first loopback packet using the first physical port;
   selecting, by the communications device, a second configuration option from the at least two configuration options in response to a fourth physical port of the communications device receiving the second loopback packet;

selecting, by the communication device, an operating system mode corresponding to the second configuration option; and configuring, by the communications device, the communications device according to the selected operating system mode corresponding to the second configuration option after the communications device restarted.

8. A communications device, comprising:

at least fourth physical ports; and a processor communicatively coupled to the at least fourth physical ports and configured to:

store an electronic label on the communications device, wherein the electronic label identifies the communications device uniquely;

send a first loopback packet using a first physical port in the at least fourth physical ports after the communications device is started, wherein the first loopback packet comprises a loopback tag and the electronic label;

select a first configuration option from at least two configuration options in response to a second physical port in the at least fourth physical ports receiving the first loopback packet, wherein each of the configuration options corresponds to a different operating system mode;

select an operating system mode corresponding to the second configuration option; and configure the communications device according to the selected operating system mode corresponding to the second configuration option after the communications device restarted.

9. The communications device of claim 8, wherein the loopback tag comprises a random value.

10. The communications device of claim 8, wherein the loopback tag comprises any two or all of the electronic label of the communications device, information about a key component of the communications device, or a random value.

11. The communications device of claim 8, wherein in response to a third physical port in the at least fourth physical ports receiving the first loopback packet, the processor is further configured to:

select a second configuration option from the at least two configuration options;

select an operating system mode corresponding to the second configuration option; and configure the communications device according to the selected operating system mode corresponding to the second configuration option after the communications device restarted.

12. The communications device of claim 8, wherein in response to any physical port other than the first physical port in the at least fourth physical ports receiving the first loopback packet, the processor is further configured to:

select the first configuration option from the at least two configuration options;

select an operating system mode corresponding to the first configuration option; and configure the communications device according to the selected operating system mode corresponding to the first configuration option after the communications device restarted.

13. The communications device of claim 8, wherein in response to none of the at least fourth physical ports receiving the first loopback packet, the processor is further configured to:

select a second configuration option from the at least two configuration options;

select an operating system mode corresponding to the second configuration option; and configure the communications device according to the selected operating system mode corresponding to the second configuration option after the communications device restarted.

14. The communications device of claim 8, wherein the processor is further configured to:

send a second loopback packet using a third physical port in the at least fourth physical ports after sending the first loopback packet using the first physical port;

select a second configuration option from the at least two configuration options in response to a fourth physical port in the at least fourth physical ports receiving the second loopback packet;

select an operating system mode corresponding to the second configuration option; and configure the communications device according to the selected operating system mode corresponding to the second configuration option after the communications device restarted.

15. The communications device configuration method of claim 1, wherein the configuration options correspond to operating systems from different manufacturers.

16. The communications device configuration method of claim 1, wherein the configuration options correspond to different use scenarios.

17. The communications device configuration method of claim 1, further comprising displaying, by the communications device, the first configuration option used by the communications device using an indicating lamp after configuring the communications device, wherein different configuration options correspond to different colors of the indicating lamp.

18. The communications device configuration method of claim 1, wherein the electronic label using a chip further identifies a type of the communications device and a number of physical ports of the communications device.

19. The communications device of claim 8, wherein the processor is further configured to display the first configuration option used by the communications device using an indicating lamp after configuring the communications device, and wherein different configuration options correspond to different colors of the indicating lamp.

20. The communications device of claim 8, wherein the electronic label using a chip further identifies a type of the communications device and a number of physical ports of the communications device.

\* \* \* \* \*